(12) United States Patent
Zhang

(10) Patent No.: US 10,207,215 B2
(45) Date of Patent: Feb. 19, 2019

(54) ACTIVE COKE REGENERATION MIXED VAPOR TREATMENT METHOD AND APPARATUS

(71) Applicants: MISSISSIPPI INTERNATIONAL WATER INC., Valley Stream, NY (US); Dawei Zhang, Shenyang, Liaoning (CN)

(72) Inventor: Dawei Zhang, Shenyang (CN)

(73) Assignees: Mississippi International Water Inc., Valley Stream, NY (US); Dawei Zhang, Shenyang (CN)

( * ) Notice: Subject to any disclaimer, the term of this patent is extended or adjusted under 35 U.S.C. 154(b) by 1082 days.

(21) Appl. No.: 14/354,018

(22) PCT Filed: Oct. 16, 2012

(86) PCT No.: PCT/CN2012/083005
§ 371 (c)(1),
(2) Date: Apr. 24, 2014

(87) PCT Pub. No.: WO2013/060244
PCT Pub. Date: May 2, 2013

(65) Prior Publication Data
US 2015/0174519 A1 Jun. 25, 2015

(30) Foreign Application Priority Data
Oct. 26, 2011 (CN) .......................... 2011 1 0327933

(51) Int. Cl.
*B01D 47/06* (2006.01)
*B01D 47/12* (2006.01)
(Continued)

(52) U.S. Cl.
CPC ......... *B01D 47/06* (2013.01); *B01D 46/0031* (2013.01); *B01D 47/05* (2013.01);
(Continued)

(58) Field of Classification Search
CPC .................. B01D 5/0027; B01D 5/003; B01D 2259/40083; B01D 2259/40086;
(Continued)

(56) References Cited

U.S. PATENT DOCUMENTS 1,493,579 A * 5/1924 Walter .................. B01D 47/06
159/4.02
3,839,971 A * 10/1974 Snelling ................ B01D 45/08
110/119
(Continued)

FOREIGN PATENT DOCUMENTS

CN 101462040 A 6/2009
CN 101732948 A 6/2010
(Continued)

OTHER PUBLICATIONS

First Office Action dated May 5, 2014 for Chinese patent application No. 201110327933.8.
(Continued)

*Primary Examiner* — Jonathan Miller
*Assistant Examiner* — Jonathan Luke Pilcher
(74) *Attorney, Agent, or Firm* — Steven McMahon Zeller; Dykema Gossett PLLC

(57) ABSTRACT

There is provided an active coke regeneration mixed vapor treatment method. The method comprises the following process steps of: A) performing a first water condensation on a mixed vapor produced during an active coke regeneration process by spray water in a first condensation zone; B) performing a second water condensation on the mixed vapor that is after the first water condensation by spray water in a second condensation zone, to further condensate and purify the mixed vapor; C) eliminating moisture in a gas through mist elimination from the gas fraction in the mixed vapor that is after the second water condensation, and discharging
(Continued)

the remaining gas from the upper of the second condensation zone; and, D) discharging active coke micro powder in the mixed vapor that is after the second water condensation, with condensation water. In the present invention, an apparatus for implementing the abovementioned method is also provided.

7 Claims, 1 Drawing Sheet

(51) Int. Cl.
| | |
|---|---|
| *B01D 5/00* | (2006.01) |
| *B01J 20/20* | (2006.01) |
| *B01D 53/00* | (2006.01) |
| *B01J 20/34* | (2006.01) |
| *B01D 53/14* | (2006.01) |
| *B01D 46/00* | (2006.01) |
| *B01D 47/05* | (2006.01) |
| *C10B 27/06* | (2006.01) |
| *C10L 3/00* | (2006.01) |
| *C10L 3/08* | (2006.01) |
| *C10L 5/28* | (2006.01) |
| *C10L 9/08* | (2006.01) |
| *B01D 45/08* | (2006.01) |

(52) U.S. Cl.
CPC ........... *B01D 47/12* (2013.01); *B01D 53/002* (2013.01); *B01D 53/1406* (2013.01); *B01J 20/20* (2013.01); *B01J 20/3416* (2013.01); *B01J 20/3466* (2013.01); *C10B 27/06* (2013.01); *C10L 3/00* (2013.01); *C10L 3/08* (2013.01); *C10L 5/28* (2013.01); *C10L 9/08* (2013.01); *B01D 5/003* (2013.01); *B01D 5/0027* (2013.01); *B01D 45/08* (2013.01); *B01D 2247/04* (2013.01); *B01D 2247/107* (2013.01); *B01D 2247/14* (2013.01); *B01D 2252/103* (2013.01); *B01D 2257/80* (2013.01); *C10L 2290/08* (2013.01)

(58) Field of Classification Search
CPC .. B01D 2259/40088; B01D 2259/4009; B01D 2259/40092; B01D 2259/40094; B01D 2259/40096; B01D 2259/40098; B01D 47/06; B01D 47/063; B01D 47/066; B01D 47/12; B01D 47/08; B01D 47/085; B01D 47/10; C10J 3/84
USPC .................................................. 95/224, 225
See application file for complete search history.

(56) References Cited

U.S. PATENT DOCUMENTS

| | | | |
|---|---|---|---|
| 4,741,889 A | | 5/1988 | Ritter et al. |
| 5,660,615 A | * | 8/1997 | Neumann ............... B01D 47/12 95/187 |
| 6,391,099 B1 | * | 5/2002 | Ina .......................... B01D 47/10 261/DIG. 54 |
| 8,388,902 B2 | * | 3/2013 | Zhang ................... B01J 20/3483 422/202 |
| 2010/0311568 A1 | * | 12/2010 | Zhang ................... B01J 20/3483 502/55 |

FOREIGN PATENT DOCUMENTS

| | | |
|---|---|---|
| CN | 101732952 A | 6/2010 |
| CN | 202270470 U | 6/2012 |

OTHER PUBLICATIONS

International Search Report PCT/CN2012/083005.
Written Opinion of International Search Report (with English translation).

\* cited by examiner

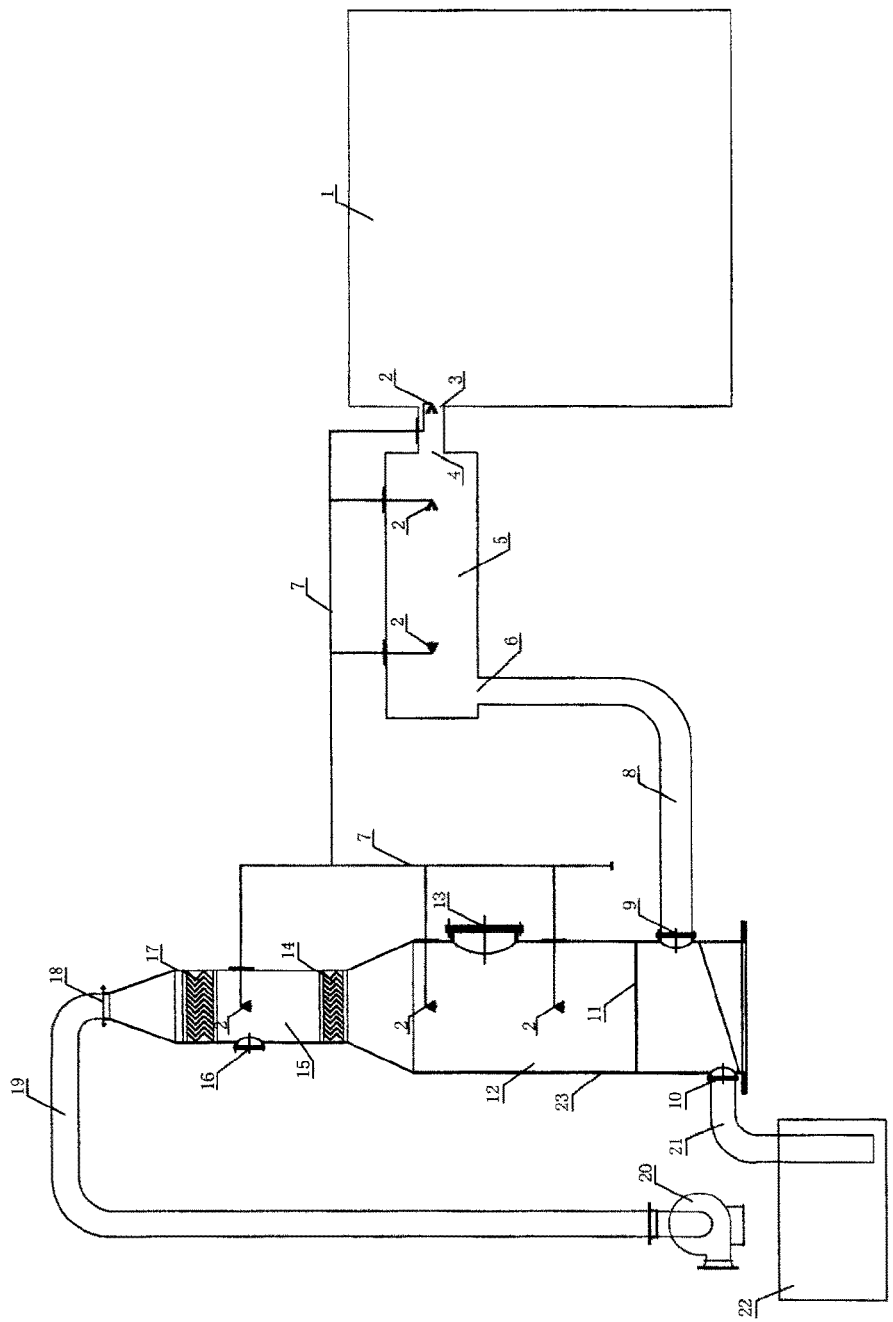

ACTIVE COKE REGENERATION MIXED VAPOR TREATMENT METHOD AND APPARATUS

BACKGROUND OF THE INVENTION

Field of the Invention

The present invention relates to vapor treatment equipment, and in particular, to a separated-area type treatment method for mixed vapor produced in active coke regeneration process.

The present invention also relates to an apparatus for performing the above-mentioned method.

Description of the Related Art

To treat waste or sewage water by active coke filtration and absorption is a newly developed waste or sewage water treatment method. By adoption of the active coke filtration and adsorption method, polluted water in urban water sources will be pretreated by removing pollutant, fungus, odor, chromaticity, etc. from the water such that the treated water meets with first-grade water source quality standards.

By adoption of the active coke filtration and adsorption method, industrial waste water from bio-chemical treatment will be deeply treated such that the treated water meets enterprise production water standards or state industry pollutant effluent standards.

Active coke after waste or sewage water treatment has absorbed a great amount of organic matter and contained lots of moisture, so the active coke after waste or sewage water treatment should be regenerated. During the active coke regeneration process, through evaporation and pyrolysis, moisture and organic matter in the active coke are gasified into a mixed vapor containing components of water vapor, active coke micro powder, methane and ethane, etc.

There are the following disadvantages when the mixed vapor produced in active coke regeneration process is treated in a conventional spray tower.

(1) The mixed vapor goes through pipeline from a vapor outlet of the regeneration equipment to a vapor inlet of the spray tower. Since the mixed vapor contains moisture and active coke powder, the active coke powder in the mixed vapor will be accumulated onto the wall of the mixed vapor transport pipeline with the action of the moisture so that the pipeline is often clogged and thus the regeneration equipment won't operate normally.

(2) If there is a higher flow velocity of the gas in the tower, water vapor in the mixed vapor won't be completely condensed and the treated gas will carry with a great amount of moisture and active coke powder, which affects gas-water separation and dust removal effect, and, the treated gas won't be recycled as fuels due to its high moisture content.

(3) If there is a lower flow velocity of the gas in the tower, most of water vapor in the mixed vapor will be condensed and the active coke powder carried in the treated gas will be purified completely, however, the treated gas still won't be recycled as fuels due to its high moisture content due to lower gas flow velocity and unsatisfactory gas-water separation and dust removal effect.

Accordingly, it is important in the present invention to provide a separated-area type treatment apparatus for mixed vapor produced in active coke regeneration process, which may overcome the disadvantages existing in the conventional equipment.

SUMMARY OF THE INVENTION

An object of the present invention is to provide an active coke regeneration mixed vapor treatment method.

Another object of the present invention is to provide an apparatus for performing the above-mentioned method.

In order to achieve the abovementioned objects, the present invention provides an active coke regeneration mixed vapor treatment method, the method comprises the following process steps of:

A) performing a first water condensation on a mixed vapor produced during an active coke regeneration process by spray water in a first condensation zone;

B) performing a second water condensation on the mixed vapor that is after the first water condensation by spray water in a second condensation zone, to further condensate and purify the mixed vapor;

C) eliminating moisture in a gas through mist elimination from the gas fraction in the mixed vapor that is after the second water condensation, and discharging the remaining gas from the upper of the second condensation zone; and, D) discharging active coke micro powder in the mixed vapor that is after the second water condensation, with condensation water.

In an embodiment of the invention, in the step of B), a flow velocity of the mixed vapor into the second condensation zone is controlled to bring a sufficient contact time for the water vapor and the active coke micro powder in the mixed vapor with the spray water such that the mixed vapor is further condensed and purified.

In an embodiment of the invention, in the step of C), a flow velocity for mist elimination is controlled such that moisture in the gas is completely eliminated during the mist elimination.

In an embodiment of the invention in the step of C), the gas discharged from the upper of the second condensation zone comprises methane and ethane.

In an embodiment of the invention, the gas discharged from the upper of the second condensation zone are reused as fuels; and, the spray water and the active coke micro powder in a variable diameter separator go from a water outlet at the lower of the condensation purification zone via a water drain pipe to a sedimentation tank.

The present invention provides an apparatus for performing the method according to claim 1, and the apparatus mainly comprises a condensation filter and a variable diameter separator. A vapor inlet for the mixed vapor is provided at one end of the condensation filter and is connected to a vapor outlet of an active coke regeneration unit, a moisture outlet is provided below the other end of the condensation filter and is connected to a moisture inlet of a condensation purification zone at the lower of the variable diameter separator, and, at least one nozzle for the spray water is mounted within the condensation filter, to form the first condensation zone.

The condensation purification zone is at the lower of the variable diameter separator and a gas-water separation zone is at the upper of the variable diameter separator, and, the condensation purification zone has a diameter greater than that of the gas-water separation zone.

The condensation purification zone is provided with a moisture inlet and a water outlet, an orifice plate is disposed at the upper of the moisture inlet, and, at least one nozzle for the spray water mounted above the orifice plate, to form the second condensation zone.

At least one mist eliminator line is provided within the gas-water separation zone, and, a gas outlet is provided at the upper of the gas-water separation zone.

The mixed vapor produced during the active coke regeneration process is introduced into the condensation filter through the vapor inlet and is performed the first water condensation by the spray water from the nozzle; the spray water and the active coke micro powder together are discharged at the condensation filter moisture outlet and are introduced into the condensation purification zone at the lower of the variable diameter separator. After performing the second water condensation and purification by the spray water from the nozzle above the orifice plate, the water vapor and the active coke micro powder in the gas go to the gas-water separation zone at the upper of the variable diameter separator. The moisture in the gas is eliminated by the mist eliminator, and, the remaining gas is discharged from the gas outlet at the above while the spray water and the active coke micro powder within the variable diameter separator are discharged at the water outlet at the lower of the condensation purification zone.

In an embodiment of the invention, two mist eliminator lines are provided within the gas-water separation zone, and one nozzle for spraying water downwardly is provided between the two mist eliminator lines. Two nozzles for spraying water downwardly are mounted above the orifice plate of the condensation purification zone.

In an embodiment of the invention, the mist eliminator is a folded plate type mist eliminator and/or a silk screen type mist eliminator.

In t an embodiment of the invention, three nozzles are mounted within the condensation filter, in which one is at a connection of the vapor inlet to the vapor outlet of the active coke regeneration unit and faces the vapor inlet, and, two opposing spouts are mounted inside the condensation filter along an axis thereof.

In an embodiment of the invention, all the nozzles are connected with a water supply pipe.

The present invention has following advantages.

(1) The mixed vapor is directed to the condensation filter for treatment after coming out from the active coke regeneration apparatus and the treated active coke micro powder carried by the condensation water and the spray water will be transported to the variable diameter separator so as to prevent the pipeline to be clogged.

(2) The condensation purification zone at the lower of the variable diameter separator has a larger diameter and thus there is sufficient contact time for the water vapor and the active coke micro powder in the gas with the spray water such that those are further condensed and purified.

(3) The gas-water separation zone at the upper of the variable diameter separator has a smaller diameter, and thus, with the help of the mist eliminator, the moisture in the fast running gas will be eliminated and the remaining of the gas, such as methane and ethane, is discharged from the gas outlet of the gas-water separation zone. Due to its low moisture content, the discharged gas possesses combustibility and can be used as fuels. Condensation water, spray water, and active coke micro powder in the water within the variable diameter separator are into sedimentation tank through the water outlet at the lower of the condensation purification zone.

The abovementioned apparatus are not disclosed by the prior art.

BRIEF DESCRIPTION OF THE DRAWINGS

FIG. 1 is a structural schematic view of the present invention.

Explanations on the reference numbers are provided for these main components in the drawings.

1. active coke regeneration apparatus, 2. nozzle, 3. vapor outlet, 4. vapor inlet, 5. condensation filter, 6. moisture outlet, 7. water supply pipe, 8. pipeline, 9. moisture inlet, 10. water outlet, 11. orifice plate, 12. condensation purification zone, 13. access port, 14. first mist eliminator line, 15. gas-water separation zone, 16. access hole, 17. second mist eliminator line, 18. gas outlet, 19. gas exhaust pipe, 20. induced draft fan, 21. water drain pipe, 22. sedimentation tank, 23. variable diameter separator.

DETAILED DESCRIPTION OF PREFERRED EMBODIMENTS OF THE INVENTION

An active coke regeneration mixed vapor treatment apparatus according to the present invention is constituted of two parts, a condensation filter and a variable diameter separator.

The variable diameter separator is divided into two zones, the lower is a condensation purification zone and the upper is a gas-water separation zone. The condensation purification zone has a diameter greater than that of the gas-water separation zone.

The condensation filter has a vapor inlet, a moisture outlet, a spout and a water supply pipe. The vapor inlet of the condensation filter is connected to the vapor outlet of the active coke regeneration apparatus. The moisture outlet of the condensation filter is connected to the moisture inlet of the variable diameter separator through pipeline.

The condensation purification zone at the lower of the variable diameter separator is provided with a moisture inlet and a water outlet, an orifice plate is disposed at the upper of the moisture inlet, at least one nozzle (in order to enhance the condensation effect, wherein in one embodiment of the present invention an example of three is shown) is mounted at the upper of the orifice plate, and the nozzle is connection to the water supply pipeline. An access port is provided at external wall of the condensation purification zone for maintenance and repair of the apparatus.

At least one mist eliminator line (in order to enhance the mist elimination effect, wherein in one embodiment of the present invention an example of two mist eliminator lines is shown) is provided in the gas-water separation zone at the upper of the variable diameter separator. The mist eliminator may be a folded plate type mist eliminator and/or a silk screen type mist eliminator, which are well-known products. Assumed that two mist eliminator lines are provided, a nozzle for spraying water downwardly and an access hole is provided between the two mist eliminator lines, and, the nozzle is connected to the water supply pipeline. A gas outlet is provided at the top of the gas-water separation zone.

The vapor inlet of the condensation filter is connected to the vapor outlet of the active coke regeneration apparatus, and, the moisture outlet of the condensation filter is connected to the moisture inlet of the condensation purification zone through pipeline. The water outlet of the condensation purification zone is connected to a sedimentation tank through pipeline.

The mixed vapor produced during the active coke regeneration process is introduced into the condensation filter through the vapor outlet. In the mixed vapor within the condensation filter, the water vapor is performed the first water condensation by the spray water from the nozzle. The active coke micro powder in the mixed vapor is washed up by the spray water from the nozzle. Non-condensable combustible gas, condensation water, spray water and active coke micro powder contained in the water are together discharged at the moisture outlet of the condensation filter, and are introduced into the condensation purification zone at the moisture inlet at the lower of the variable diameter separator.

The condensation purification zone at the lower of the variable diameter separator has a larger diameter such that there is sufficient contact time for the water vapor and the active coke micro powder in the gas with the spray water during the second water condensation, so as to ensure further condensation and purification. A flow velocity of the gas within the condensation purification zone is controlled to bring a sufficient contact time for the water vapor and the active coke micro powder in the mixed vapor and the spray water, and in the present invention, the preferred flow velocity is 0.5-1.5 m/s. The further condensed and purified gas goes into the gas-water separation zone at the upper of the variable diameter separator. The moisture in the flowing gas is eliminated by means of the mist eliminator, and the remaining gas, such as methane and ethane, is discharged from the gas outlet, the gas exhaust pipe and the induced draft fan at the upper of the gas-water separation zone. The flow velocity of the gas without the moisture is controlled such that the moisture in the gas is completely eliminated during the mist elimination, and in the present invention, the preferred flow velocity is 3-5 m/s. The discharged gas is combustible due to low moisture content and thus may be utilized as fuels. The condensation water in the variable diameter separator, the spray water, and the active coke micro powder contained in the water are discharged at the water outlet at the lower of the condensation purification zone and go to the sedimentation tank through the water drain pipe.

The present invention will be described hereinafter in detail by referring to the embodiments taken in conjunction with the accompanying drawings.

EXAMPLES

As shown in FIG. 1, a separated type treatment apparatus for mixed vapor produced in active coke regeneration process according to the present invention is constituted of two parts, a condensation filter 5 and a variable diameter separator 23.

At the lower of the variable diameter separator 23 is a condensation purification zone 12 and at the upper is the gas-water separation zone 15. The condensation purification zone 12 has a diameter greater than that of the gas-water separation zone 15.

The condensation filter 5 is in a cylindrical configuration, and has a vapor inlet 4 provided at one end and a moisture outlet 6 below the other end thereof. The condensation filter 5 is mounted with three nozzles 2. Two spouts 2 are mounted inside the condensation filter 5 along an axis thereof. One nozzle 2 which is extended into a vapor outlet 3 of the active coke regeneration unit outwardly is provided at one end of the vapor inlet 4. All the nozzles 2 are connected with a water supply pipe 7.

The condensation purification zone 12 at the lower of the variable diameter separator 23 has a moisture inlet 9 and a water outlet 10. An orifice plate 11 is at the upper of the moisture inlet 9. Two nozzles 2, upper and lower, at the upper of the moisture inlet 9 are connected with a water supply pipe 7. An access port 13 is provided at the external wall of the condensation purification zone 12.

A first mist eliminator line 14 and a second mist eliminator line 17 are provided in the gas-water separation zone 15 at the upper of the variable diameter separator 23. The first mist eliminator line 14 and the second mist eliminator line 17 may be a folded plate type mist eliminator and/or a silk screen type mist eliminator, which are well-known products.

A nozzle 2 for spraying water downwardly and an access hole 16 is provided between the first mist eliminator line 14 and the second mist eliminator line 17 in the gas-water separation zone 15 at the upper of the variable diameter separator 23, and, the nozzle 2 is connected to the water supply pipe 7. A gas outlet 8 is provided at the top of the gas-water separation zone 15.

The condensation purification zone 12 at the lower of the variable diameter separator 23 is designed with a gas flow velocity of 0.5-1.5 m/s, and the gas-water separation zone 15 at the upper of the variable diameter separator 23 is designed with a gas flow velocity of 3-5 m/s. The condensation filter 5 is designed with a gas flow velocity of 0.5-1.5 m/s.

The vapor inlet 4 of the condensation filter 5 is connected to the vapor outlet 3 of the active coke regeneration apparatus, and, the moisture outlet 6 of the condensation filter 5 is connected to the moisture inlet 9 of the condensation purification zone 12 through pipeline 8. The water outlet 10 of the condensation purification zone 12 is connected to a sedimentation tank 22 through pipeline 21.

The mixed vapor produced during the active coke regeneration process is introduced into the condensation filter 5 through the vapor outlet 3. In the mixed vapor within the condensation filter, the water vapor is performed condensation by the spray water from the nozzle 2. The active coke micro powder in the mixed vapor is washed up by the spray water from the nozzle 2. Non-condensable combustible gas, condensation water, spray water and active coke micro powder contained in the water are together discharged at the moisture outlet 6 of the condensation filter 5, and are introduced into the condensation purification zone 12 from the moisture inlet 9 through pipeline 8. The gas in the condensation purification zone 12 has a designed flow velocity of 0.5-1.5 m/s such that there is sufficient contact time for the water vapor and the active coke micro powder in the gas with the spray water, thus, the gas is further condensed and purified and then is introduced into the gas-water separation zone 15 at the upper of the variable diameter separator 23. The gas in the gas-water separation zone 15 has a designed flow velocity of 3-5 m/s. The moisture in the fast flowing gas is eliminated by means of the first mist eliminator line 14 and the second mist eliminator line 17, and the remaining gas, such as methane and ethane, is discharged from the gas outlet 18, the gas exhaust pipe 19 and the induced draft fan 20 at the upper of the gas-water separation zone 15. The discharged gas is combustible due to low moisture content and thus may be utilized as fuels. The condensation water in the variable diameter separator 23, the spray water, and the active coke micro powder contained in the water are discharged at the water outlet 10 at the lower of the condensation purification zone 12 and go to the sedimentation tank 22 through the water drain pipe 21.

What is claimed is:

1. A method for treatment of a mixed vapor in an active coke regeneration, the method comprising the following process steps of:
A) performing a first water condensation on a mixed vapor, produced during an active coke regeneration process, by spray water in a first condensation zone located in a first structure;
B) performing a second water condensation on the mixed vapor, after the first water condensation, by spray water in a second condensation zone located in a second structure separate from the first structure, to further condense and purify the mixed vapor, wherein a flow velocity of the mixed vapor within the second condensation zone is controlled at a range of 0.5-1.5 m/s to achieve a sufficient contact time for water vapor and active coke micro powder in the mixed vapor and spray water;

C) eliminating moisture in a gas fraction of the mixed vapor trough mist elimination in a gas-water separation zone located in the second structure after the second condensation zone, and then discharging the gas from an upper portion of the second structure, wherein a flow velocity of the gas is controlled in a range of 3-5 m/s such that the moisture in the gas is completely eliminated during the mist elimination; and D) discharging condensation water together with active coke micro powder removed from the mixed vapor, in the first structure and in the second structure.

2. The method according to claim 1, wherein, in the step of B), a flow velocity of the mixed vapor into the second condensation zone is controlled to bring a sufficient contact time for the water vapor and the active coke micro powder in the mixed vapor with the spray water such that the mixed vapor is further condensed and purified.

3. The method according to claim 1, wherein, in the step of C), the gas discharged from the upper of the second condensation zone comprises methane and ethane.

4. The method according to claim 3, wherein the gas discharged from the upper of the second condensation zone are reused as fuels, and the condensation water and the active coke micro powder removed from the mixed vapor is discharged via a water drain pipe to a sedimentation tank.

5. The method according to claim 1, wherein the gas discharged from the upper portion of the second condensation zone are reused as fuels, and the condensation water and the active coke micro powder removed from the mixed vapor is discharged via a water drain pipe to a sedimentation tank.

6. The method according to claim 1, wherein a flow velocity of the gas of the mixed vapor through mist elimination in step C is greater than a flow velocity of the mixed vapor in the second condensation zone.

7. The method according to claim 1, wherein the products of the first condensation are conveyed together to the second condensation zone before the second water condensation is performed.

* * * * *